United States Patent
Sayre et al.

(10) Patent No.: US 10,361,607 B2
(45) Date of Patent: Jul. 23, 2019

(54) ALTERNATOR WITH SERIES FANS

(71) Applicant: BorgWarner, Pendleton, IN (US)

(72) Inventors: Drake Sayre, Middletown, IN (US); Duane Buening, Fishers, IN (US)

(73) Assignee: BorgWarner Inc., Auburn Hills, MI (US)

( * ) Notice: Subject to any disclaimer, the term of this patent is extended or adjusted under 35 U.S.C. 154(b) by 148 days.

(21) Appl. No.: 14/949,537

(22) Filed: Nov. 23, 2015

(65) Prior Publication Data
US 2017/0149308 A1    May 25, 2017

(51) Int. Cl.
| | |
|---|---|
| *H02K 9/06* | (2006.01) |
| *H02K 9/02* | (2006.01) |
| *H02K 9/04* | (2006.01) |
| *H02K 5/20* | (2006.01) |
| *H02K 9/12* | (2006.01) |
| *H02K 9/08* | (2006.01) |

(52) U.S. Cl.
CPC .............. *H02K 9/06* (2013.01); *H02K 5/20* (2013.01); *H02K 9/02* (2013.01); *H02K 9/04* (2013.01); *H02K 9/08* (2013.01); *H02K 9/12* (2013.01)

(58) Field of Classification Search
CPC .. H02K 9/06; H02K 5/20; H02K 9/00; H02K 9/005; H02K 9/02; H02K 9/04; H02K 9/08; H02K 9/10; H02K 9/12; H02K 9/14; H02K 9/16; H02K 9/18; H02K 9/22; H02K 9/28
USPC ...... 310/52, 55, 56, 57, 58, 59, 60 R, 62, 63
See application file for complete search history.

(56) References Cited

U.S. PATENT DOCUMENTS

| | | | | |
|---|---|---|---|---|
| 4,757,221 | A * | 7/1988 | Kurihashi | H02K 9/06 310/43 |
| 6,435,828 | B1 | 8/2002 | Bostwick | |
| 6,700,235 | B1 * | 3/2004 | McAfee | H02K 9/06 310/52 |
| 2004/0145254 | A1 * | 7/2004 | Buening | F04D 29/281 310/62 |
| 2010/0301689 | A1 * | 12/2010 | Hayashi | H02K 9/06 310/62 |

OTHER PUBLICATIONS

National Quick Start Sales, Exploded View, available at least as early as Nov. 23, 2015, 3 pages, available at https://alternatorparts.com/xcs130d.html.

* cited by examiner

*Primary Examiner* — Bernard Rojas
*Assistant Examiner* — Alexander A Singh
(74) *Attorney, Agent, or Firm* — Maginot, Moore & Beck LLP (57) ABSTRACT

An electric machine for a vehicle comprises a housing, a rotor shaft, a first fan member, and a second fan member. The housing includes a first end portion having at least one air inlet opening and an opposite second end portion having at least one air outlet opening. The rotor shaft extends through at least one of the first end portion and the second end portion and is configured to rotate relative to the housing. The first fan member is located within the housing and is mounted on the rotor shaft. The second fan member is located outside of the housing and is mounted on the rotor shaft. Rotation of the rotor shaft causes each of the first and second fan members to generate an airflow from the at least one air inlet opening to the at least one air outlet opening.

20 Claims, 6 Drawing Sheets

ALTERNATOR WITH SERIES FANS

FIELD

This disclosure relates to the field of electric machines and in particular to airflow systems for electric machines.

BACKGROUND

A vehicle electrical system includes a battery, an engine, and an alternator among other components. The battery is typically used to supply a starter motor with electrical energy for starting the engine. The engine includes a rotating output that is used to drive a transmission of the vehicle for moving the vehicle. The alternator is connected to the rotating output of the engine and operates as an electrical energy generator. In particular, the alternator converts mechanical energy from the operating engine into electrical energy for consumption by the vehicle. In a common configuration, the electrical energy from the alternator charges the battery so that the battery is maintained at a state of charge sufficient for starting the engine.

The typical alternator includes a stator and a rotor shaft supporting a field coil. The field coil is located in proximity to the stator, and a belt connects the rotor shaft and field coil to the rotating output of the engine. Operation of the engine results in rotation of the rotor shaft and the field coil relative to the stator. Current flowing through the rotating field coil induces a corresponding current in the stator. The corresponding current of the stator is rectified and conditioned to provide electrical energy for consumption by the vehicle.

In addition to generating electrical energy, the alternator also generates heat. Specifically, the electrical interaction between the field coil and the stator heats the field coil and the stator. This heat radiates to each other component of the alternator and increases the overall temperature of the alternator. Typically, it is desirable to maintain the alternator within a particular range of operating temperatures; thus, most alternators include at least one fan that is configured to expel heat from the alternator. However, as customers require more output out of smaller machines, improved cooling methods become desirable, because prior art cooling methods are not optimized for cooling modern alternators. For example, a prior art alternator may include an internal fan and an external fan. In response to being rotated, the internal fan generates a first airflow and the external fan generates a second airflow. Instead of working together to optimally cool the alternator, portions of the airflows generated by the fans interfere and conflict with each other, thereby resulting in a non-optimized configuration that does not cool the alternator in the most effective manner. In the worst case, exhaust air from one fan tries to exit an outlet opening that also acts as an inlet opening for the other fan, resulting in interference of the airflows, such that efficient cooling of the alternator is diminished. In another example, a prior art alternator may include internal fans which are too small to effectively cool a high power alternator, or an external fan which is unable to provide desired cooling to all components simultaneously.

Based on the above, further developments in the area of cooling fans for alternators are desirable.

SUMMARY

According to an exemplary embodiment of the disclosure, an electric machine for a vehicle comprises a housing, a rotor shaft, a first fan member, and a second fan member. The housing including a first end portion having at least one air inlet opening and an opposite second end portion having at least one air outlet opening. The rotor shaft extends through at least one of the first end portion and the second end portion and is configured to rotate relative to the housing. The first fan member is located within the housing and is mounted on the rotor shaft. The second fan member is located outside of the housing and is mounted on the rotor shaft. Rotation of the rotor shaft causes each of the first and second fan members to generate an airflow from the at least one air inlet opening to the at least one air outlet opening.

According to another exemplary embodiment of the disclosure, an electric machine for a vehicle comprises a housing, a stator, a field coil, a first fan member, and a second fan member. The stator is located within the housing. The field coil is located in proximity to the stator and is configured to rotate relative to the stator about an axis of rotation. The first fan member is located within the housing at a first end of the field coil and is configured to rotate with the field coil and to generate a first airflow primarily in an axial direction defined by the axis of rotation. The second fan member is located at a second opposite end of the field coil and is configured to rotate with the field coil and to generate a second airflow in the axial direction. The axial direction extends from the first fan member to the second fan member.

According to yet another exemplary embodiment of the disclosure, an electric machine for a vehicle includes a housing, a rotor shaft, a first fan member, and a second fan member. The housing includes a first end portion, an opposite second end portion, and an axial portion extending from the first end portion to the second end portion. The first end portion includes at least one air inlet opening, and the second end portion includes at least one air outlet opening. The axial portion is void of the at least one air outlet opening. The rotor shaft extends through at least one of the first end portion and the second end portion, and is configured to rotate relative to the housing. The first fan member is located within the housing and is mounted on the rotor shaft. The second fan member is located outside of the housing and is mounted on the rotor shaft.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Figure 1:
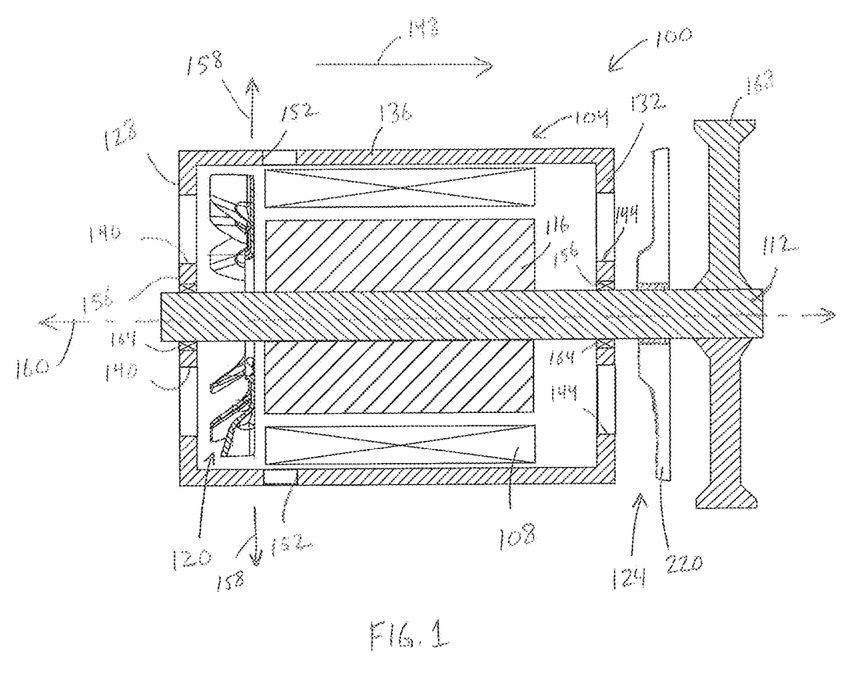
FIG. 1 is a cross sectional view of an alternator assembly, as disclosed herein, including a front end fan member and a rear end fan member that are configured to generate complementary airflows.
Figure 2:
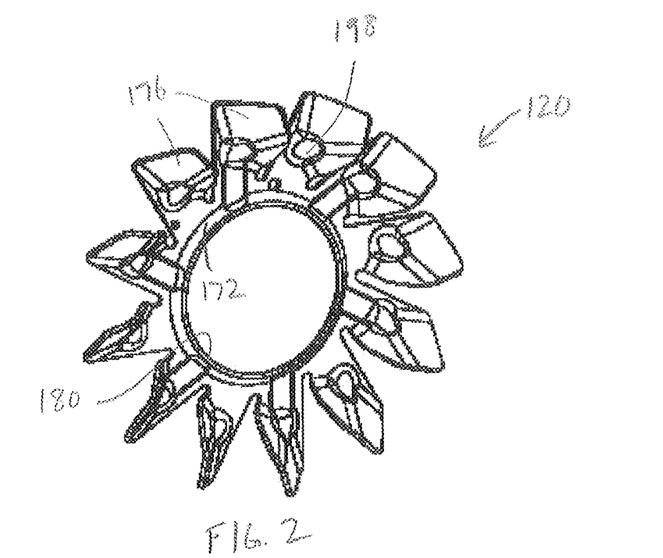
FIG. 2 is a perspective view of the rear end fan member of the alternator assembly of FIG. 1.
Figure 3:
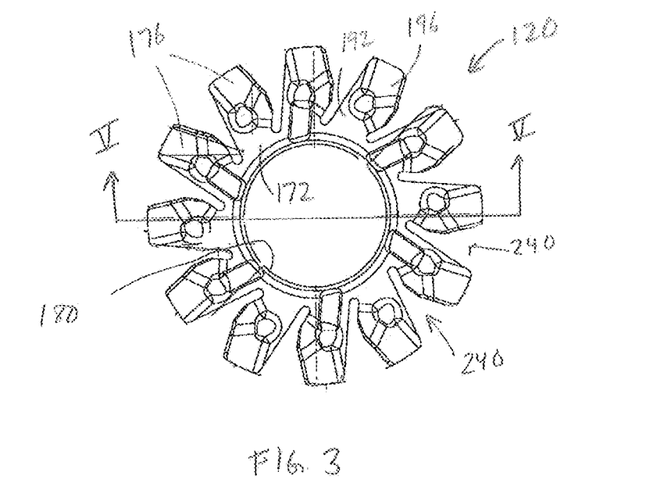
FIG. 3 is a plan view of the rear end fan member of the alternator assembly of FIG. 1.

As shown in FIG. 1, an alternator assembly 100 includes a housing 104, a stator 108 located within the housing 104, a rotor shaft 112, a field coil 116, a rear end fan member 120, and a front end fan member 124. The housing 104 includes a rear end portion 128, an opposite front end portion 132, and an axial portion 136 extending from the rear end portion 128 to the front end portion 132. The rear end portion 128 is substantially circular and includes at least one air inlet 140 opening that extends completely through the rear end portion 128. In FIG. 1, two of the air inlet openings 140 are partially shown. The air inlet openings 140 are formed as circular passages through the rear end portion 128. In another embodiment, the rear end portion 128 includes from one to fifty of the air inlet openings 140, and the openings 140 have any desired shape.

The front end portion 132 is substantially circular and includes at least one air outlet opening 144 that extends completely through the front end portion 132. In FIG. 1, two of the air outlet openings 144 are partially shown. The air outlet openings 144 are formed as circular passages through the front end portion 132. In the illustrated embodiment, the air outlet openings 144 are aligned with the air inlet openings 140 in an axial direction 148, which extends from the rear end portion 128 toward the front end portion 132. In another embodiment, the front end portion 132 includes from one to fifty of the air outlet openings 144, and the openings 144 have any desired shape.

The axial portion 136 is substantially cylindrical and is terminated by the rear end portion 128 and the front end portion 132. The axial portion 136 includes at least one air inlet opening 152. In the illustrated embodiment, two of the inlet openings 152 are partially shown. The air inlet openings 152 are formed as circular passages through the axial portion 136. In the exemplary embodiment of FIG. 1, the air inlet openings 152 are located between the front end portion 132 of the housing 104 and a plane 158 defined by the rear end fan member 120. The air inlet openings 152 are located at any point on the axial portion 136 between the plane 158 and the front end portion 132, such that no portion of the air inlet openings 152 overlaps with the rear end fan member in the axial direction 148. Accordingly, there are no openings formed in the axial portion 136 between the plane 158 and the rear end portion 128 of the housing 104. In another embodiment, the axial portion 136 includes from one to fifty of the air inlet openings 152, and the openings 152 have any desired shape. Moreover, in at least one embodiment, the axial portion 136 is substantially imperforate except for the air inlet openings 152, such that the axial portion 136 is completely void of all air outlets.

With continued reference to FIG. 1, the rotor shaft 112 extends through shaft openings 156 defined in the rear end portion 128 and the front end portion 132 of the housing 104. The rotor shaft 112 is configured for rotation relative to the housing 104 about an axis of rotation 160 that is parallel to the axial direction 148. Bearings 164 are configured to rotatably support the rotor shaft 112, and to prevent airflow through the openings 156. A pulley 168 is fixedly mounted on the rotor shaft 112 and is configured to support an endless belt (not shown) for operably connecting the alternator assembly 100 to a motor (not shown).

The field coil 116 is fixedly mounted on the rotor shaft 112 in proximity to the stator 108, such that the field coil 116 is configured for rotation relative to the stator 108 about the axis of rotation 160. The field coil 116 is operably connected to the stator 108, in a manner known to those of ordinary skill in the art.

The rear end fan member 120 is located adjacent to the rear end portion 128 of the housing 104 and is shown as an axial-flow fan. The rear end fan member 120 is fixedly mounted on the rotor shaft 112 for rotation with the rotor shaft 112. In the illustrated embodiment, the rear end fan member 120 is located within the housing 104 between the air inlet openings 140 of the first end portion 128 and the air inlet openings 152 of the axial portion 136 along the axis of rotation 160. The rear end fan member 120 is also located between the rear end portion 128 and the field coil 116 along the axis of rotation 160. In another embodiment, the rear end fan member 120 is located outside of the housing 104 on the opposite side of the rear end portion 128.

An exemplary embodiment of the rear end fan member 120 is shown in FIGS. 2-6. The rear end fan member 120 includes a hub 172 and a plurality of blades 176. The hub 172 defines a circular opening 180, the center of which is aligned with the axis of rotation 160. The diameter of the circular opening 180 is approximately the same as the diameter of the rotor shaft 112. In one embodiment, the hub 172 is press fit onto the rotor shaft 112.

Figure 4:
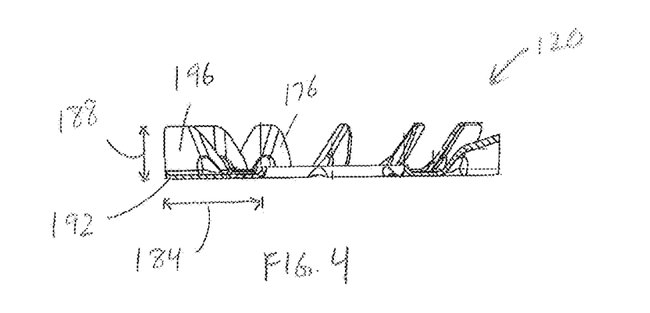
FIG. 4 is a cross sectional view of the rear end fan member taken along line V-V of FIG. 1.
Figure 5:
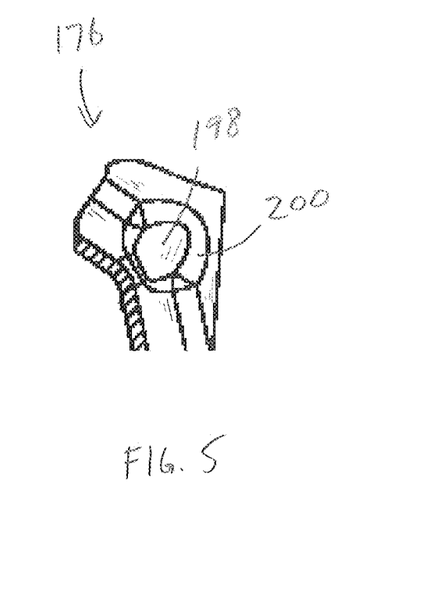
FIG. 5 is a perspective cross sectional view of a blade of the rear end fan member of the alternator assembly of FIG. 1.
Figure 6:
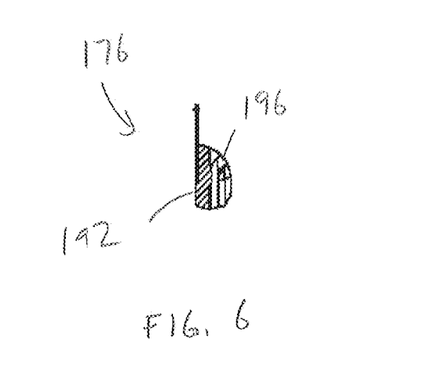
FIG. 6 is an elevational view of a blade portion of the rear end fan member of the alternator assembly of FIG. 1.

As shown in FIG. 4, the blades 176 extend radially away from the hub 172 for a radial distance 184 and axially away from the hub 172 for an axial distance 188. Each blade 176 defines a generally radial portion 192, a generally axial portion 196, and flat plateau portion 198. The axial portion 196 is angled with respect to the radial portion 192, such that a plane defined by the axial portion 196 intersects a plane defined by the radial portion 192. The plateau portion 198 is a substantially flat portion of the blade 176 that is bordered by a chamfered portion 200 (FIG. 5). In the illustrated embodiment, the rear end fan member 120 defines twelve of the blades 176; however, in other embodiments, the rear end fan member 120 defines any desired number of the blades 176. Moreover, in the illustrated embodiment, each blade 176 is imperforate.

Figure 7:
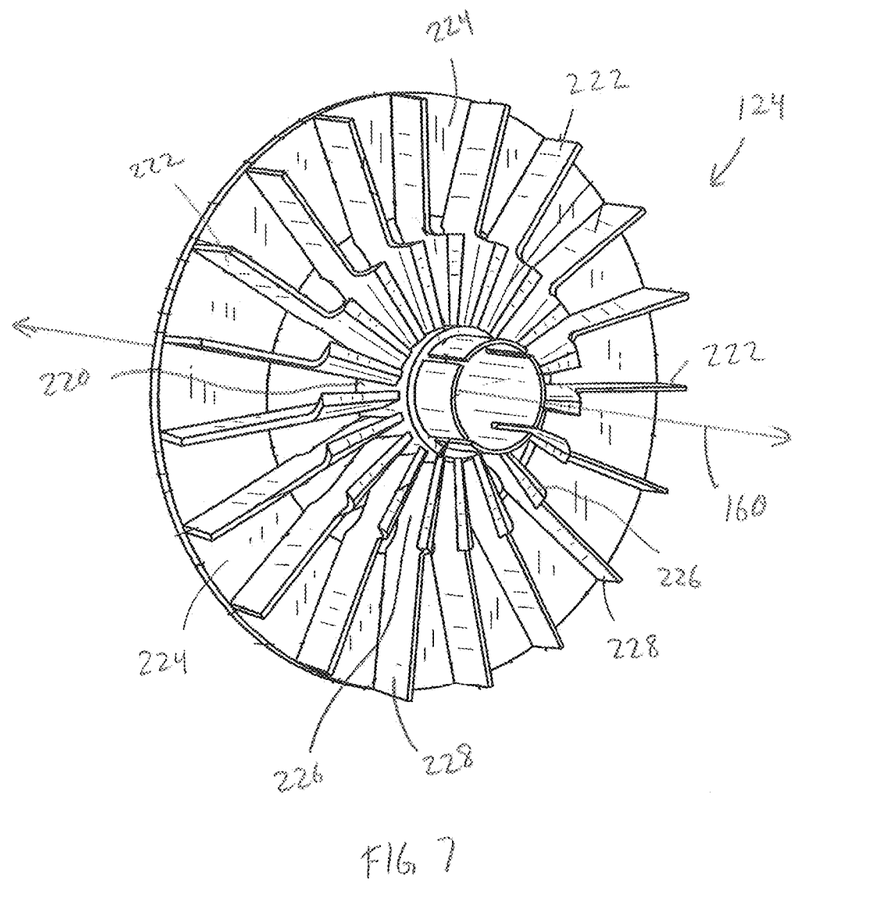
FIG. 7 is a perspective view of the front end fan member of the alternator assembly of FIG. 1.

As shown in FIG. 7, an exemplary embodiment of the front end fan member 124 includes a hub 220, a plurality of blades 222, and a backplate 224. The hub 220 is configured, in at least one embodiment, to be slip fit onto the rotor shaft 112 and clamped in place by a shaft nut (not shown). The blades 222 extend radially away from the hub 220, and each blade 222 defines a radially inner portion 226 and a radially outer portion 228. The radially inner portions 226 are configured to pull air in the axial direction 148 (FIG. 1) when the front end fan member 124 is rotated. The radially outer portions 228 are configured to push air in a radially outward direction (radially away from the axis of rotation 160) when the front end fan member 124 is rotated. The backplate 224 is connected to at least the radially outer portions 228 and is substantially imperforate. The backplate 224 is configured at least partially to prevent airflow through the front end fan member 124 in the axial direction 148 (FIG. 1). In another embodiment, the front end fan member 124 is provided as any desired type of fan member, including a fan member without a distinct radially inner portion 226 and a radially outer portion 228.

With reference again to FIG. 1, the front end fan member 124 is fixedly mounted on the rotor shaft 112 for rotation with the rotor shaft 112. In the illustrated embodiment shown in FIG. 1, the front end fan member 124 is located outside of the housing 104 between the air outlet openings 144 and the pulley 168 along the axis of rotation 160. In another embodiment, the front end fan member 124 is located inside of the housing 104 on the opposite side of the front end portion 132, between the front end portion 132 and the field coil 116.

Figure 8:
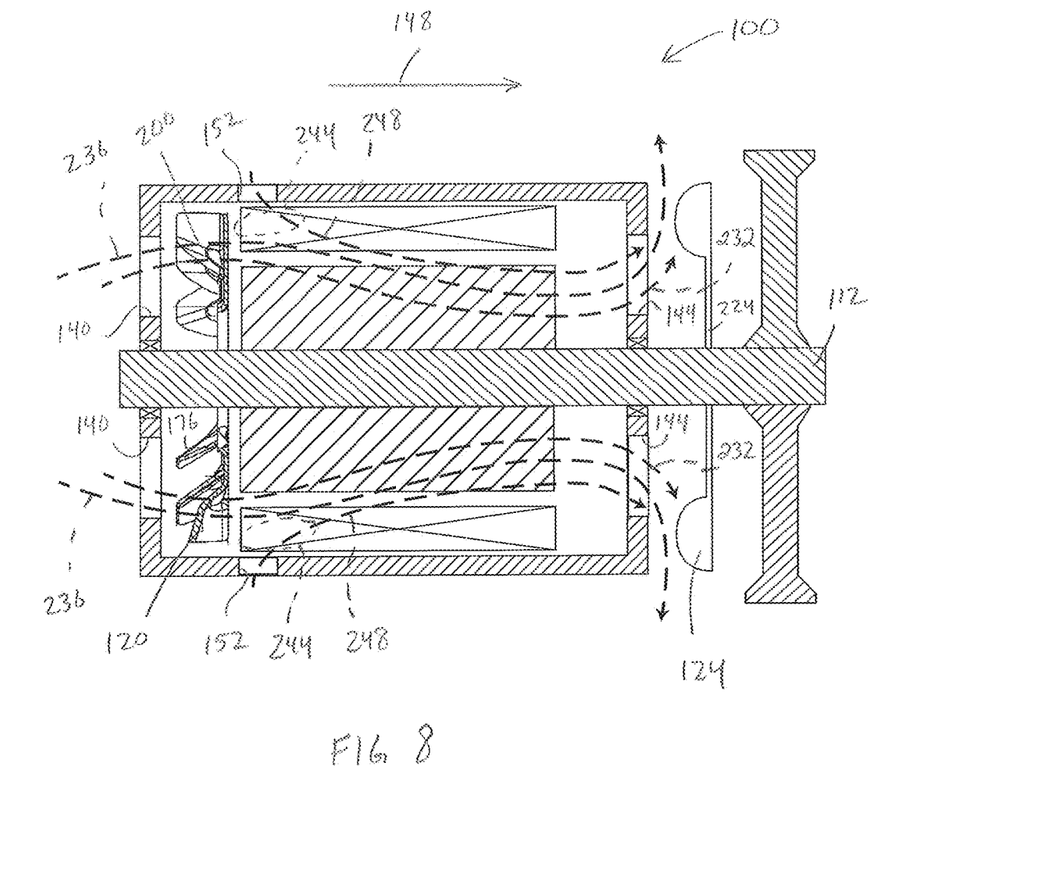
FIG. 8 is a cross sectional view of the alternator assembly of FIG. 1, showing airflows generated by the rear end fan member and the front end fan member.

In operation, the alternator assembly 100 generates airflow through the housing 104 that efficiently cools the stator 108, the field coil 116, and any electronic components (such as a voltage regulator) located within or in proximity to the housing 104. As shown in FIG. 8, during rotation of the rotor shaft 112, the rear end fan member 120 generates an airflow 232 that extends through the housing 104 in primarily the axial direction 148. In particular, the rear end fan member 120 pulls air into the housing 104 through air inlet openings 140 and pushes air out of the housing 104 through the air outlet openings 144. The airflow 232 is described as being "primarily" in the axial direction 148, because the rear end fan member 120 may generate smaller airflows (not shown) in a direction other than the axial direction 148. For example, the smaller airflows generated by the rear end fan member 120 may flow somewhat in a radial direction, may circulate within the housing 104, or may flow in any other direction. However, the rotation of the rear end fan member 120 predominately generates airflow 232, which moves primarily in the axial direction 148 (e.g. the airflow 232 moves from left to right on the page as shown in FIG. 1, but not necessarily in a straight line). The rear end fan member 120 is distinguished from a radial fan member, which generates airflow primarily in a radial direction.

Due at least in part to the gaps 240 between the blades 176, the airflow 232 flows through the rear fan member 120 in the axial direction 148. The airflow 232 is pushed toward the front end fan member 124 past the stator 108 and the field coil 116, such that the airflow 232 carries heat away from the stator 108, the field coil 116, and the voltage regulator; thereby maintaining the stator 108, the field coil 116, and the voltage regulator at an optimized operating temperature. The number of the gaps 240 and the total area of the gaps 240 contributes to the volume of air that the airflow 232 carries through the rear end fan member 120.

During rotation of the rotor shaft 112, the front end fan member 124 generates a primary airflow 236 that extends through the housing 104 in primarily the axial direction 148. Specifically, the front end fan member 124 pulls air into the housing 104 through air inlet openings 140 and pulls air out of the housing 104 through the air outlet openings 144. The front end fan member 124 directs the airflow 236 radially away from the rotor shaft 112 (relative to the axis of rotation 160) after the airflow 236 is pulled through the air outlet openings 144. Also, the front end fan member 124 pulls air through gaps 240 (FIG. 3) between the blades 176 of the rear end fan member 120. In the illustrated embodiment, the airflow 236 is prevented from passing through the backplate 224; however, in other embodiments the backplate 224 may define openings (not shown) through which the airflow 236 may pass.

The airflows 232, 236 generated by the fan members 120, 124 generate a low pressure space 244 within the housing 104 near the air inlet openings 152 in the axial portion 136 of the housing 104. The air pressure in the low pressure space 244 is lower than an air pressure outside of the housing 104 near the air inlets 152. Accordingly, the pressure differential created by the airflows 232, 236 induces another airflow 248 that is pulled into the housing 104 through the air inlet openings 152, is pushed out of the housing 104 through the air outlets 144 by the rear end fan member 120, and is pulled out of the housing 104 through the air outlets 144 by the front end fan member 124. Accordingly, as shown in FIG. 8, no portion of the airflows 232, 236, 248 exit the housing through the axial portion 136, which, as stated above, is void of all air outlets.

The rear end fan member 120 and the front end fan member 124 are arranged in series, such that the fans 120, 124 work together to create the airflows 232, 236, 248, which are primarily in the axial direction 148. The fans 120, 124 are also described as being arranged in a serial configuration with respect to the axis of rotation 160 (FIG. 1). Fan members arranged in a serial configuration have the same axis of rotation and generate airflows primarily in the same direction. Thus, in the embodiment of FIG. 8, the airflow 232 generated by the rear end fan member 120 and the airflow 236 generated by the front end fan member 124 combine serially to form a combined airflow 232, 236, 248 that extends from the air inlet openings 140, 152 to the air outlet openings 144.

In FIG. 8, the airflows 232, 236, 248 are shown as taking a particular path through the housing 104. The actual paths of the airflows 232, 236, 248 may deviate from that shown in FIG. 8, due at least to turbulent air within the housing 104 generated by the rotating field coil 116, for example. The turbulent air, among other factors, results in commingling of the airflows 232, 236, 248 within the housing 104. Nonetheless, the airflows 232, 236, 248 each primarily flow in the axial direction 148.

Figure 9:
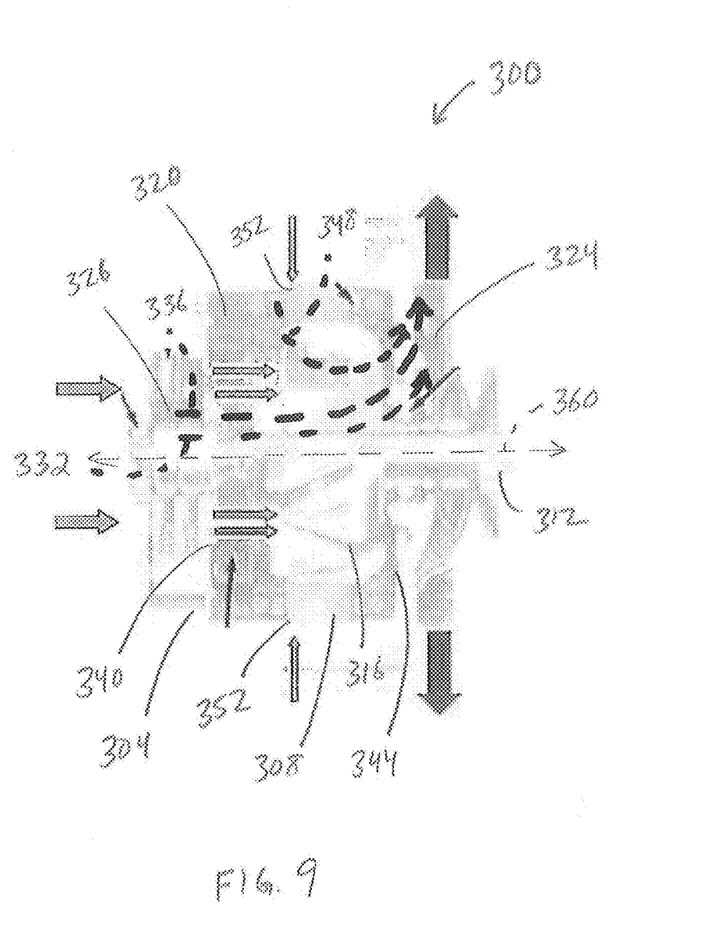
FIG. 9 is a cutaway view of another embodiment of an alternator assembly including a rear end fan member and a front end fan member that are configured to generate complementary airflows.

As shown in FIG. 9, another embodiment of the alternator assembly 300 includes a housing 304, a stator 308 located within the housing 304, a rotor shaft 312, a field coil 316, a rear end fan member 320, and a front end fan member 324. Slip rings 326 are operably connected to the field coil 316 through the rotor shaft 312, which rotates about an axis of rotation 360. The housing 104 includes at least one air inlet 340 opening, at least one air inlet opening 352, and at least one air outlet opening 344.

In operation, the alternator assembly 300 generates airflows 332, 336, 348 through the housing 304 that efficiently cool the stator 308, the field coil 316, and any electronic components (such as a voltage regulator) located within or in proximity to the housing 304. In particular, rotation of the rear end fan member 320 generates the airflow 332, which is pulled into the housing 304 through the air inlets 340 and pushed out of the housing 304 through the air outlets 344. Rotation of the front end fan member 324 generates the airflow 336, which is pulled into the housing 304 through the air inlets 340 and pulled out of the housing 304 through the air outlets 344. The airflows 332, 336 induce the airflow 348, which is pulled into the housing 304 through the air inlets 352, pushed out of the housing 304 through the air outlets 344 by the rear end fan member 320, and pulled out of the housing 304 through air outlets 344 by the front end fan member 324. The rear end fan member 320 and the front end fan member 324 are arranged in a serial configuration with respect to the axis of rotation 360.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. An electric machine for a vehicle comprising:
a housing including a rear end portion having at least one air inlet opening, an opposite front end portion having at least one air outlet opening, and an axial portion extending from the rear end portion to the front end portion, the axial portion of the housing including at least one air inlet opening;
a field coil positioned within the housing between the rear end portion and the front end portion;
a rotor shaft extending through at least one of the rear end portion and the front end portion and configured to rotate relative to the housing;
a first fan member located within the housing between the rear end portion and the field coil, the first fan member mounted on the rotor shaft, the first fan member defining a radial plane positioned axially forward of the first fan member between the first fan member and the field coil and extending through the axial portion of the housing, wherein the axial portion of the housing is imperforate rearward of the radial plane such that the at least one air inlet opening on the axial portion of the housing is positioned forward the radial plane; and
a second fan member located outside of the housing and mounted on the rotor shaft,
wherein rotation of the rotor shaft causes each of the first and second fan members to generate an airflow from the at least one air inlet opening on the rear end portion of the housing to the at least one air outlet opening on the front end portion of the housing such that a low pressure space is generated by the airflow immediately adjacent to and radially inward from the at least one air inlet opening on the axial portion of the housing between the first fan member and the second fan member.

2. The electric machine of claim 1, further comprising:
openings defined in blades of the first fan member, the openings configured such that the airflows extend through the first fan member.

3. The electric machine of claim 1, wherein:
the first fan member is configured to pull air into the housing through the at least one air inlet opening on the rear end portion, and
the second fan member is configured to pull air into the housing through the at least one air inlet opening on the rear end portion.

4. The electric machine of claim 1, wherein:
the first fan member is configured to push air out of the housing through the at least one air outlet opening, and
the second fan member is configured to pull air out of the housing through the at least one air outlet opening.

5. The electric machine of claim 1, wherein the airflow generated by the first fan member and the airflow generated by the second fan member combine serially to form a combined airflow from the at least one air inlet opening to the at least one air outlet opening.

6. The electric machine of claim 1 wherein the second fan member is positioned adjacent to the front end portion of the housing.

7. The electric machine of claim 1 wherein the at least one air inlet opening on the axial portion of the housing is positioned directly across from the rear end of the field coil, and the axial portion of the housing is substantially imperforate with the exception of the at least one air inlet opening.

8. An electric machine for a vehicle comprising:
a housing including a first end portion, an opposite second end portion, and an axial portion extending from the first end portion to the second end portion, the axial portion of the housing including at least one air inlet opening;
a stator located within the housing;
a field coil located in proximity to the stator and configured to rotate relative to the stator about an axis of rotation, the field coil including a first end and an opposite second end;
a first fan member located within the housing between the first end portion of the housing and the first end of the field coil, the first fan member configured to rotate with the field coil and to generate a first airflow primarily in an axial direction defined by the axis of rotation, the first fan member defining a radial plane positioned between the first fan member and the field coil, wherein the axial portion of the housing is imperforate between the first end portion of the housing and the radial plane, and wherein the at least one air inlet opening of the housing is positioned between the radial plane and the second end portion of the housing; and
a second fan member located outside of the housing such that the second end portion of the housing is positioned between the second fan member and the second end of the field coil, the second fan member configured to rotate with the field coil and to generate a second airflow in the axial direction, the axial direction extending from the first fan member to the second fan member, wherein the first airflow and the second airflow provide a low pressure space immediately adjacent to and radially inward from the at least one air inlet opening between the first fan member and the second fan member.

9. The electric machine of claim 8, further comprising:
openings defined in blades of the first fan member, the openings configured such that the first airflow extends through the first fan member in the axial direction.

10. The electric machine of claim 8, further comprising:
at least one air inlet opening defined by the first end portion of the housing; and
at least one air outlet opening defined by the second end portion of the housing,
wherein the axial direction extends from the at least one air inlet opening defined by the first end portion of the housing to the at least one air outlet opening defined by the second end portion of the housing.

11. The electric machine of claim 10, wherein:
the first fan member is configured to pull the first airflow into the housing through the at least one air inlet opening defined by the first end portion of the housing, and
the second fan member is configured to pull the second airflow into the housing through the at least one air inlet opening defined by the second end axial portion of the housing.

12. The electric machine of claim 10, wherein:
the first fan member is configured to push the first airflow out of the housing through the at least one air outlet opening, and
the second fan member is configured to pull the second airflow out of the housing through the at least one air outlet opening.

13. The electric machine of claim 8, wherein the first fan member and the second fan member are arranged in a serial configuration with respect to the axis of rotation.

14. The electric machine of claim 8 wherein the at least one air inlet opening on the axial portion of the housing is positioned directly across from the rear end of the field coil, and the axial portion of the housing is substantially imperforate with the exception of the at least one air inlet opening.

15. An electric machine for a vehicle comprising:
a housing including a first end portion, an opposite second end portion, and an axial portion extending from the first end portion to the second end portion, the first end portion including at least one air inlet opening, the second end portion including at least one air outlet opening, and the axial portion including at least one air inlet opening;
a rotor shaft extending through at least one of the first end portion and the second end portion, and configured to rotate relative to the housing;
a field coil located within the housing between the first end portion and the second end portion of the housing;
a first fan member located within the housing between the first end portion of the housing and the field coil, the first fan member mounted on the rotor shaft; and
a second fan member located outside of the housing at the second end portion of the housing and mounted on the rotor shaft,
wherein the first fan member defines a radial plane positioned between the first fan member and the field coil, wherein the axial portion of the housing is imperforate between the first end portion of the housing and the radial plane, and wherein the at least one air inlet opening of the axial portion of the housing is positioned between the radial plane and the second end portion of the housing, wherein rotation of the rotor shaft causes each of the first and second fan members to generate an airflow through the housing such that a low pressure space is generated immediately adjacent to and radially inward from the at least one air inlet opening on the axial portion of the housing.

16. The electric machine of claim 15, further comprising:
openings defined in blades of the first fan member.

17. The electric machine of claim 15, wherein:
the first fan member is configured to pull air into the housing through the at least one air inlet opening included on the first end portion, and
the second fan member is configured to pull air into the housing through the at least one air inlet opening included on the first end portion and the at least one air inlet opening on the axial portion of the housing.

18. The electric machine of claim 15, wherein:
the first fan member is configured to push air out of the housing through the at least one air outlet opening, and
the second fan member is configured to pull air out of the housing through the at least one air outlet opening.

19. The electric machine of claim 15, wherein the first fan member and the second fan member are arranged in a serial configuration with respect to an axis of rotation defined by the rotor shaft.

20. The electric machine of claim 15 wherein the second end portion of the housing is positioned between the second fan member and the field coil.

* * * * *